(12) United States Patent
Zhu et al.

(10) Patent No.: US 9,699,446 B2
(45) Date of Patent: Jul. 4, 2017

(54) TEST AND MEASUREMENT DEVICE, SYSTEM, AND METHOD FOR PROVIDING SYNCHRONIZED MEASUREMENT VIEWS

(75) Inventors: Xinyu Zhu, Portland, OR (US); Barry A. McKibben, Beaverton, OR (US); Laurent A. Melling, Jr., Scappoose, OR (US); Kevin T. Ivers, Woodland, WA (US); Michael S. Overton, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 299 days.

(21) Appl. No.: 12/754,583

(22) Filed: Apr. 5, 2010

(65) Prior Publication Data
US 2011/0242333 A1   Oct. 6, 2011

(51) Int. Cl.
*H04N 17/00*   (2006.01)

(52) U.S. Cl.
CPC .................................. *H04N 17/00* (2013.01)

(58) Field of Classification Search
CPC .............................. H04N 17/00; H04N 17/02
USPC ................................................. 348/180–186
See application file for complete search history.

(56) References Cited

U.S. PATENT DOCUMENTS

| | | |
|---|---|---|
| 4,677,481 A | 6/1987 | Nicholas |
| 4,743,844 A * | 5/1988 | Odenheimer et al. .... 324/121 R |
| 4,953,017 A * | 8/1990 | Ivey ....................... H04N 17/02 348/185 |
| 5,629,957 A | 5/1997 | Murata |
| 6,532,024 B1 | 3/2003 | Everett et al. |
| 2004/0218044 A1 | 11/2004 | Baker |
| 2008/0124050 A1 * | 5/2008 | Deschamp et al. ........... 386/109 |

FOREIGN PATENT DOCUMENTS

EP   0336594 A2   10/1989

OTHER PUBLICATIONS

Tektroniks "TDS200 Series Digital Real Time Oscilloscope User Manual" Nov. 15, 2000.*
Tektroniks "Introduction to Video Measurements: Using a 4000 Series Digital Phosphor Oscilloscope" Copyright 2007.*
(Continued)

*Primary Examiner* — Michael Teitelbaum
(74) *Attorney, Agent, or Firm* — Michael A. Nelson; Kevin D. Dothager; Marger Johnson

(57) ABSTRACT

Embodiments of the invention include a test and measurement device, system, and method for synchronizing measurement views and configuration parameters across multiple input channels or devices. A method includes receiving signals under test associated with multiple input channels of the test and measurement instrument or with multiple devices, selecting a measurement view of one input signal or device, receiving a synchronized view enable preference from a user control interface, and synchronizing the measurement view or configuration parameters of the other signals or devices with what was chosen on the first signal or device. A test and measurement instrument includes input terminals to receive the input signals, a user control interface to receive input from an operator, a display to provide measurement information about the input signals, and a synchronization control unit to synchronize measurement views and/or configuration parameters between the inputs or devices.

27 Claims, 15 Drawing Sheets

(56) References Cited

OTHER PUBLICATIONS

LeCroy "Zi-8CH-Synch Oscilloscope" Copyright 2009.*
European Search Report, dated Mar. 11, 2013.
"MSO4000 and DPO4000 Series Digital Phosphor Oscilloscopes User Manual" by Tektronix. Inc., Document No. 071-2121-04 (i.e. Ver. 4), Release Date: Jan. 14, 2010—08:00 am, pp. 34-38, 62-64, 91-92, <http://www.tek.com/oscilloscope/dpo4054-manual/mso4000-and-dpo4000-series-0>.
"Mixed Signal Oscilloscopes MSO4000 Series, DPO4000 Series Data Sheet (attached)" by Tektronix, Inc., Oct. 28, 2009, part No. 3GW-20156-7, pp. 1-20, <https://www.atecorp.com/ATECorp/media/pdfs/data-sheets/Tektronix-MSO4000_Series_Datasheet.pdf>.

* cited by examiner

DISPLAY ~135

| Video Session - Channel 1 | | | | | | Video Session - Channel 2 | | | | | |
|---|---|---|---|---|---|---|---|---|---|---|---|
| Input: SDI Input 1B  Signal: Locked | | | | | | Input: SDI Input 1A  Signal: Locked | | | | | |
| Effective: Auto 1080i 59.94 - HD SDI 422 - 292M 1.485/M Gbps | | | | | | Effective: Auto 1080i 59.94 - HD SDI 422 - 292M 1.485/M Gbps | | | | | |
| Selected: Auto Format - Auto Structure - Auto Transport | | | | | | Selected: Auto Format - Auto Structure - Auto Transport | | | | | |
| 352M Payload: None | | | | | | 352M Payload: None | | | | | |
| SAV Place Err: OK | | | Y Stuck Bits: — — — | | | SAV Place Err: OK | | | Y Stuck Bits: — — — | | |
| Field Length Err. OK | | | C Stuck Bits: — — — | | | Field Length Err. OK | | | C Stuck Bits: — — — | | |
| Line Length Er: OK | | | | | | Line Length Er: OK | | | | | |
| Line Number Er: OK | | | | | | Line Number Er: OK | | | | | |
| Ancillary Data: None | | | | | | Ancillary Data: Y and C Present | | | | | |
| Statistics | Status | Err Secs | Err Fields | % Err Fields | | Statistics | Status | Err Secs | Err Fields | % Err Fields | |
| RGB Gamut Error | OK | 0 | 0 | 0.0000 % | | RGB Gamut Error | r-g-b | 286 | 17025 | 2.4238 % | |
| Cmpst Gamut Error | C- | 310 | 18529 | 100.0000 % | | Cmpst Gamut Error | OK | 11 | 516 | 0.0735 % | |
| Luma Gamut Error | OK | 0 | 0 | 0.0000 % | | Luma Gamut Error | -1 | 287 | 17034 | 2.4214 % | |
| Y Chan CRC Error | OK | 6 | 70 | 0.0099 % | | Y Chan CRC Error | OK | 0 | 0 | 0.0000 % | |
| C Chan CRC Error | OK | 6 | 70 | 0.0099 % | | C Chan CRC Error | OK | 0 | 0 | 0.0000 % | |
| Y Anc Checksum Error | OK | 1 | 1 | 0.0001 % | | Y Anc Checksum Error | OK | 0 | 0 | 0.0000 % | |
| C Anc Checksum Error | OK | 1 | 1 | 0.0001 % | | C Anc Checksum Error | OK | 0 | 0 | 0.0000 % | |
| Black Events: 0  Frozen Events 1 | | | | | | Black Events: 0  Frozen Events 10 | | | | | |
| Changed since reset: Yes  Run Time: 0 d, 03:16:08  Running | | | | | | Changed since reset: Yes  Run Time: 0 d, 03:16:08  Running | | | | | |
| Press "SEL" to reset.  Any "arrow key" stops/starts. | | | | | | Press "SEL" to reset.  Any "arrow key" stops/starts. | | | | | |

| Error Status Log - SDI Input 1B | | | Page 2 of 4 | | Error Status Log - SDI Input 1A | | | Page 2 of 3 |
|---|---|---|---|---|---|---|---|---|
| Error Status | Date | Timecode | Time | | Error Status | Date | Timecode | Time |
| ⌒ SDI Input Missing (Signal Detected) | 08-Mar-10 | | 12:00:18 | | ⌒ Composite Gamut Error | 08-Mar-10 | | 12:00:41 |
| ⌒ SDI Input Signal Lock (Locked) | 08-Mar-10 | | 12:00:18 | | ⌒ Frozen Frame Events | 08-Mar-10 | | 12:00:42 |
| ⌒ Y Anc Parity Error (Error) | 08-Mar-10 | | 12:00:18 | | ⌒ RGB Gamut Error (-r-g-b) | 08-Mar-10 | | 12:00:42 |
| ⌒ Y Anc Parity Error (Error) | 08-Mar-10 | | 12:00:18 | | ⌒ Luma Gamut Error (-1) | 08-Mar-10 | | 12:00:42 |
| 8⌒ SDI Fmt (Auto 1080i 60) | 08-Mar-10 | | 12:00:19 | | ⌒ Frozen Frame Events | 08-Mar-10 | | 12:00:43 |
| ⌒ Frozen Frame Events | 08-Mar-10 | | 12:00:19 | | ⌒ Frozen Frame Events | 08-Mar-10 | | 12:00:43 |
| ⌒ Composite Gamut Error (C-) | 08-Mar-10 | | 12:00:19 | | ⌒ Composite Gamut Error (C-) | 08-Mar-10 | | 12:00:43 |
| ⌒ Y Anc Parity Error (OK) | 08-Mar-10 | | 12:00:19 | | ⌒ Frozen Frame Events | 08-Mar-10 | | 12:00:43 |
| ⌒ Frozen Frame Events | 08-Mar-10 | | 12:00:21 | | ⌒ RGB Gamut Error | 08-Mar-10 | | 12:00:44 |
| ⌒ SDI Input Missing (Signal Missing) | 08-Mar-10 | | 12:00:21 | | ⌒ Luma Gamut Error | 08-Mar-10 | | 12:00:44 |
| ⌒ SDI Input Signal Lock (Unlocked) | 08-Mar-10 | | 12:00:21 | | ⌒ Frozen Frame Events | 08-Mar-10 | | 12:00:49 |
| ⌒ Composite Gamut Error | 08-Mar-10 | | 12:00:21 | | ⌒ Frozen Frame Events | 08-Mar-10 | | 12:00:49 |
| ⌒ Y Anc Parity Error (Error) | 08-Mar-10 | | 12:00:21 | | ⌒ Frozen Frame Events | 08-Mar-10 | | 12:00:49 |
| ⌒ SDI Input Missing (Signal Detected) | 08-Mar-10 | | 12:00:21 | | ⌒ Frozen Frame Events | 08-Mar-10 | | 12:00:50 |
| ⌒ SDI Input Signal Lock (Locked) | 08-Mar-10 | | 12:00:21 | | ⌒ Frozen Frame Events | 08-Mar-10 | | 12:00:50 |
| 8⌒ SDI Fmt (Auto None) | 08-Mar-10 | | 12:00:21 | | ⌒ Frozen Frame Events | 08-Mar-10 | | 12:00:51 |
| ⌒ Y Anc Parity Error (Error) | 08-Mar-10 | | 12:00:21 | | ⌒ RGB Gamut Error (-r-g-b) | 08-Mar-10 | | 12:00:51 |
| Arrow Left = Previous, Right = Next, Up = First, Down = Last. | | | | | Arrow Left = Previous, Right = Next, Up = First, Down = Last. | | | |

| 1080i 59.94 | CMPST Gamut | Sync Vu | Mar 08 12:05:35 | 1080i 59.94 | Embd: PPPP — — — | A+H |
|---|---|---|---|---|---|---|
| SDI Input 1B | Embd: — — — | | | SDI Input 1A | | |
| Ref: Internal | TC: Disabled | | | Ref: Internal | TC: Disabled | |

FIGURE 10

TEST AND MEASUREMENT DEVICE, SYSTEM, AND METHOD FOR PROVIDING SYNCHRONIZED MEASUREMENT VIEWS

BACKGROUND

Test and measurement instruments are fundamental to analyzing the quality of electrical signals. Such instruments allow a variety of industries to develop and test new products, maintain quality control, and deliver high value products and services. Industries such as computers, electronics, video, entertainment, and industrial manufacturing, among others, rely heavily on the ability to efficiently test and analyze electrical signals.

For instance, in the video production and broadcasting industry, video signal analysis and comparison is essential to the successful delivery of high-quality video. Multiple cameras are often necessary, and it can be difficult to adjust these to have the same luminance and chrominance levels for the video recording stage. In studios, video producers need to verify that particular changes occurred at a given time and position after the video is edited. Broadcast stations must maintain certain quality and characteristics for video distribution and real-time processing. Equipment and distribution trouble-shooting also requires comparisons of video from different inputs, outputs, and transmission points.

Conventionally, video signal comparisons are carried out using multiple video waveform monitors connected to different video signals. Alternatively, one waveform monitor might be used with input signal switches at the front end. An operator typically sets up the waveform monitor for one specific measurement display, and then performs visual comparison on multiple waveform monitors, or otherwise displays and compares one output at a time. Some waveform monitors such as the Tektronix® WFM7000/6000 and WVR7000/6000 series monitors, support video comparison between previously frozen or captured traces and live signals.

However, there are inherent drawbacks, difficulties, and unreliability associated with the traditional comparison methods for video signals. Configuring multiple video waveform monitors to have the same measurement display with identical settings is very tedious and error prone because measurement displays most often require that multiple parameters be set, including filters, component selections, gains settings, and so forth. Moreover, comparing a previously captured display with a live measurement display is also prone to result in confusion or error and is not reliable. Such approaches unavoidably miss the dynamic characteristics of video signals.

SUMMARY

Embodiments of the subject invention include a method for synchronizing measurement views of a test and measurement instrument having multiple input channels.

For a single test and measurement instrument with multiple inputs, an example method includes receiving signals under test associated with multiple input channels of the test and measurement instrument, selecting a measurement view of one input signal, receiving a synchronized view enable preference from a user control interface, and synchronizing the measurement view or configuration parameters of one or more other signals with that chosen for the first signal.

For a system of multiple test and measurement devices, an example method includes receiving signals under test associated with one or multiple input channels of each test and measurement device, selecting one or more measurement views on one of the devices, receiving a synchronized view enable preference from a user control interface, and synchronizing the measurement views or configuration parameters of the other devices with those chosen for the first device.

The method may include receiving a first signal under test associated with a first channel of the test and measurement instrument, receiving a second signal under test associated with a second channel of the test and measurement instrument, selecting a measurement view of the first signal associated with the first channel, receiving a synchronized view enable preference from a user control interface, and synchronizing the measurement views of the first signal with the second signal. The method may also include receiving an input through a user control interface for adjusting one or more configuration parameters of the first signal associated with the first channel, and replicating the one or more configuration parameters to the second signal associated with the second channel. The method may also include maintaining the synchronization of the measurement views and/or configuration parameters over a period of time, including when subsequent changes are made to the operating parameters.

In addition to synchronizing measurement views and configuration parameters across multiple inputs of a single test and measurement instrument, measurement views and configuration parameters can be synchronized across multiple test and measurement instruments. For instance, example methods can further include receiving a third signal under test associated with a first channel of a second test and measurement instrument, receiving a fourth signal under test associated with a second channel of the second test and measurement instrument, and synchronizing the measurement view with at least one of the third and fourth signal associated with the first and second channels, respectively, of the second test and measurement instrument.

Embodiments of the invention include a test and measurement instrument having multiple input terminals to receive the input signals, a user control interface to receive input from an operator, a display to provide measurement information about the input signals, and a synchronization control unit to synchronize measurement views and/or configuration parameters between the multiple inputs.

Some embodiments of the subject invention include a test and measurement instrument having a first input terminal to receive a first video signal associated with a first channel, a second input terminal to receive a second video signal associated with a second channel. The instrument may also include a user control interface configured to receive input, a display to provide measurement information about the first and second video signals, and a synchronization control unit to synchronize a measurement view between the first and second video signals of the first and second channels, respectively, responsive to the input.

The test and measurement instrument can have two, four, or any number of inputs for receiving multiple input signals. Measurement views and/or configuration parameters can be synchronized across the multiple inputs or across multiple instruments.

BRIEF DESCRIPTION OF THE DRAWINGS

FIG. 10 illustrates an example embodiment showing a status and session display measurement view of video signals in various tiles of the display.

DETAILED DESCRIPTION

A dual simultaneous input capable test and measurement instrument, such as a video waveform monitor, can perform independent monitoring and measurement tasks on two or more inputs simultaneously and independently. Embodiments of the present invention provide a special mode of simultaneous inputs where measurement views and/or configuration parameters are synchronized across multiple signals and input channels. In other words, rather than individually configuring each measurement view for each individual input channel, and as a result, suffering tedious and error-prone attempts at matching multiple configuration parameters across different input signals, the embodiments of the present invention significantly simplify the comparison and analysis of different video signals, audio signals, timecode signals, ancillary data signals, or other electrical signals by synchronizing the adjustments of one input channel with that of another input channel.

Embodiments of the present invention may include a test and measurement instrument. The test and measurement instrument can include a waveform monitor, vectorscope, logic analyzer, or oscilloscope, among other suitable measurement devices. While this disclosure gives particular emphasis to a waveform monitor and its associated measurement views, it should be understood that the scope of the invention should not be limited thereto, and can be embodied within a variety of test and measurement devices.

For the sake of brevity but not limitation, the test and measurement instrument will generally be referred to herein as a video waveform monitor, or simply a "waveform monitor" or "video monitor." Moreover, while the input signals under test received by the waveform monitor are most often referred to herein as "input video signals" or merely "video signals," it should be understood that the input signals can include audio, timecode, ancillary data, or other electrical signals, or any combination thereof. The waveform monitor may have multiple channels or inputs suitable for use with various embodiments as described herein. Although the waveform monitor may have a single input terminal, inventive aspects described are equally applicable to a waveform monitor having two or four inputs, or any number of inputs.

Preferably, waveform monitors have two or more input terminals so that the measurement views and configuration parameters are synchronized across the multiple inputs. Indeed, the waveform monitor can have four input terminals, or more than four input terminals, for receiving four or more signals under test associated with four or more channels of the test and measurement instrument, respectively, and synchronizing a measurement view of at least one signal with at least another signal, or between all of the signals. Alternatively, waveform monitors can have one or more input terminals, and the measurement views and configuration parameters can be synchronized across multiple waveform monitors.

Figure 1:
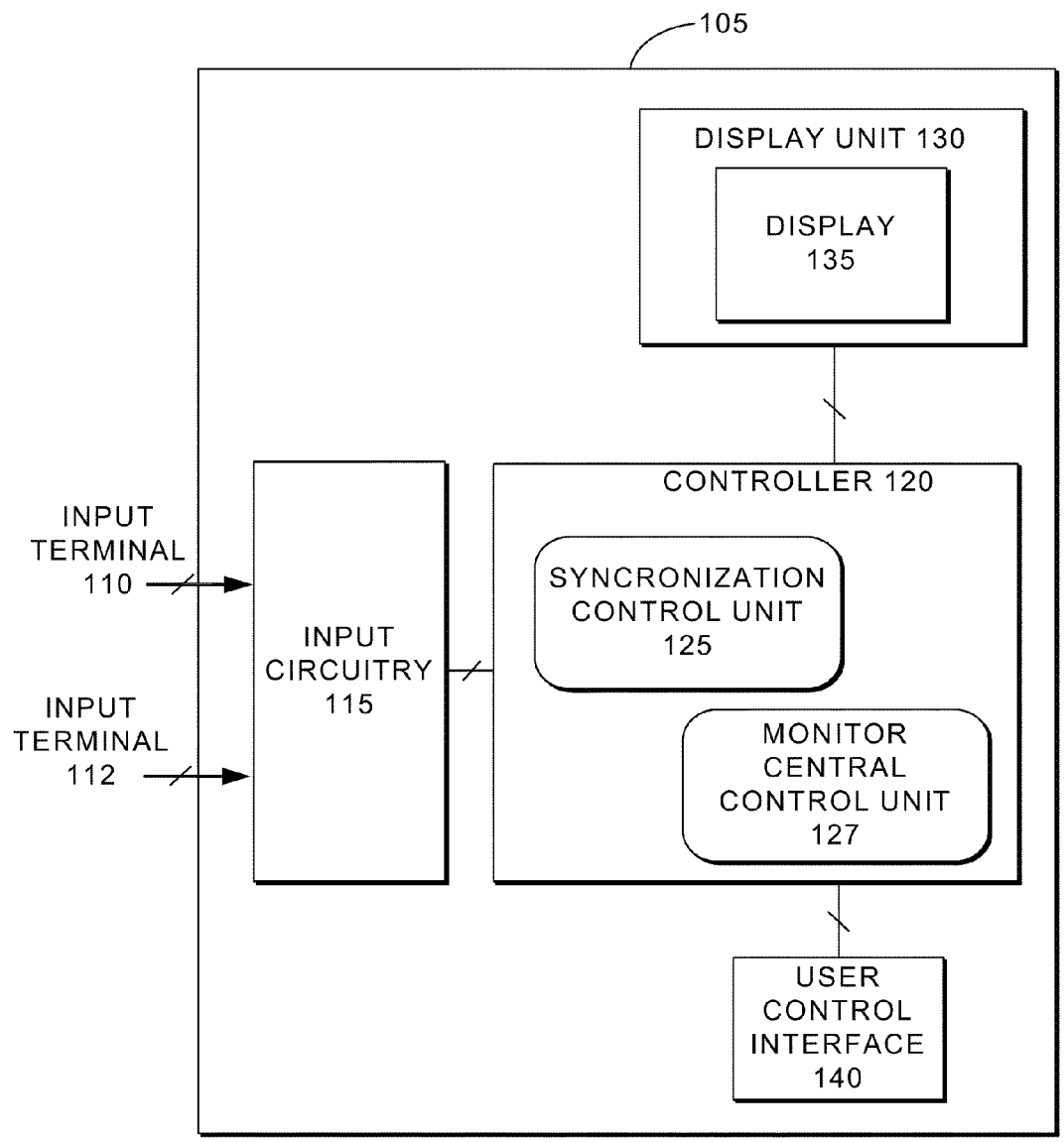
FIG. 1 illustrates a block diagram of a test and measurement instrument including a controller, a display unit, input circuitry, and a user control interface, according to an example embodiment.

FIG. 1 illustrates a block diagram of a test and measurement instrument 105, generally referred to herein as a waveform monitor, including a controller 120, a display unit 130, input circuitry 115, and a user control interface 140, according to an example embodiment. One or more input terminals 110 and 112 are operatively coupled to the input circuitry 115, which is structured to receive and process one or more signals under test. As mentioned above, the signals under test can be video signals, audio signals, or other types of electrical signals—and any combination thereof. The display unit 130 can include a display 135 for displaying the signal under test including measurement or analysis information about the signals. A user control interface 140 accepts input from an operator, such as commands to select a measurement view and/or configuration parameters. Further, the operator can indicate adjustments to the measurement view and/or configuration parameters. The user control interface 140 transmits the input to the monitor central control unit 127 of the controller 120, which processes the input and controls other components of the waveform monitor.

The controller 120 includes a synchronization control unit 125, which engages and maintains synchronized measurement views and configuration parameters for multiple video input channels. When the synchronized view is not enabled (i.e., in a traditional mode where settings on each tile can be changed independently), the synchronization control unit 125 is essentially "transparent" and does not regulate or modify the controls and measurement data of the waveform monitor. When the synchronized view is engaged by receiving a synchronized view enable preference from the user control interface 140, the synchronization control unit 125 can synchronize measurement views between input channels, and can maintain synchronization by replicating any control from one input channel to another. These and other aspects of the synchronization control unit 125 will be discussed in further detail with reference to the figures below.

Any of the components of the waveform monitor 105 can be implemented or otherwise embodied in hardware, such as an application specific integrated circuit (ASIC), field programmable gate array (FPGA), digital signal processor (DSP), volatile memory, non-volatile memory, or microprocessor, and/or software such as specially generated programs or codes structured to operate in conjunction with the hardware listed above, firmware, or any combination thereof.

Figure 2:
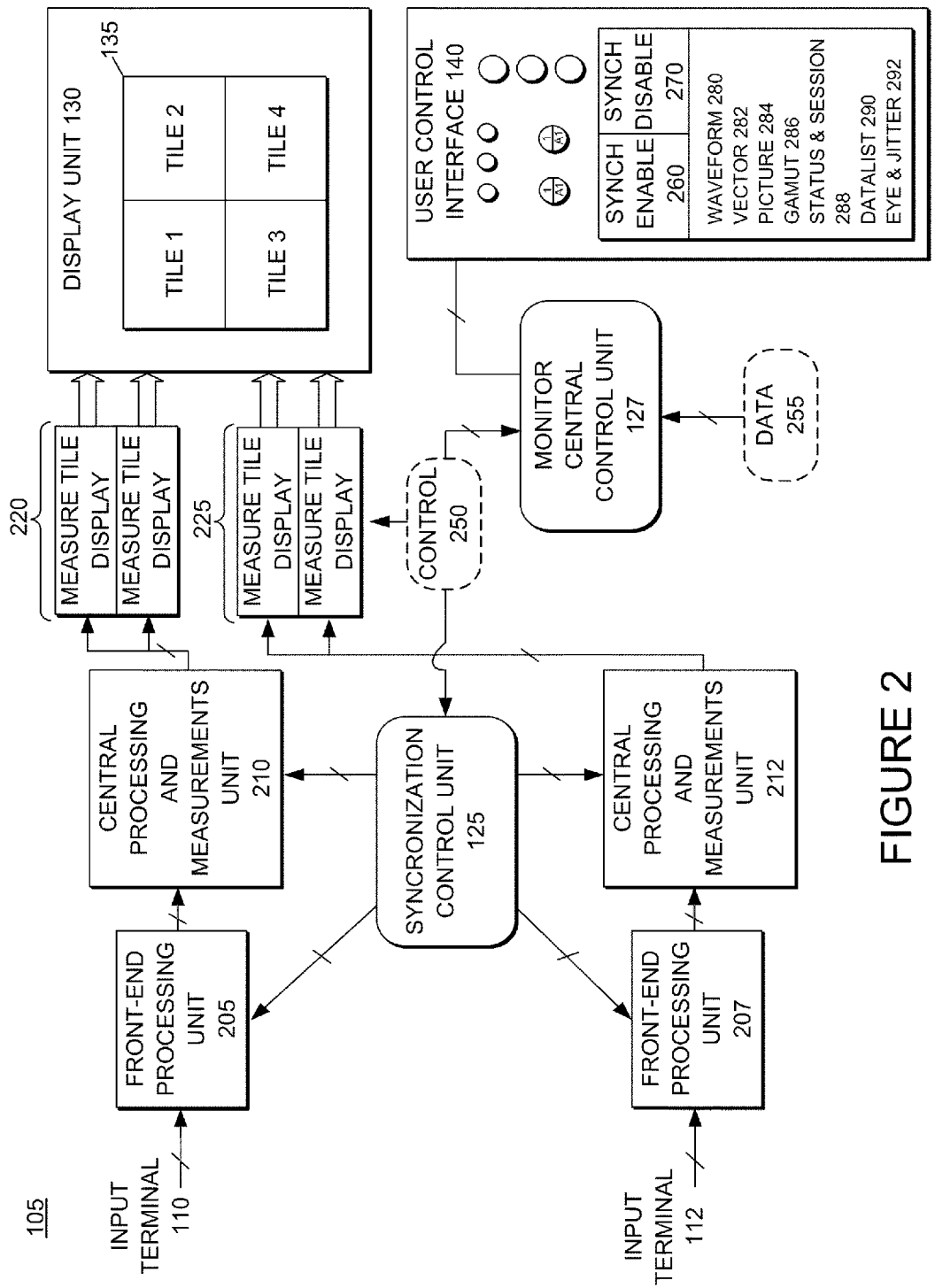
FIG. 2 illustrates a more detailed block diagram of the test and measurement instrument of FIG. 1.

FIG. 2 illustrates a more detailed block diagram of the test and measurement instrument 105 of FIG. 1. Front-end processing units 205 and 207 are coupled to input terminals 110 and 112, respectively, and perform first-stage processing for video signals received over the terminals. The input terminals 110 and 112 are associated with "channels" of the waveform monitor 105. When referred to herein, a channel generally refers to a series of hardware or software components that receive and process, store, and/or display a given signal under test such as a video signal. Central processing and measurement units 210 and 212 process the corresponding video signals and may also perform error detection. Measure tile displays 220 and 225 receive the input signals from the central processing and measurement units 210 and 212, respectively, and then rasterize and display each signal to a corresponding one of the tiles 1, 2, 3, or 4 of the display 135. The measure tile displays 220 and 225 process the video signals with particular video selections and configuration parameters such as a filter level, gain, position, magnification, or other suitable settings.

The monitor central control unit 127 interfaces with an operator of the waveform monitor 105 via the user control interface 140, which can include a front panel, touch screen, and/or remote user interfaces, among other suitable interfaces. The user control interface 140 may be associated with the display 135.

Measurement data 255 is received at the monitor central control unit 127 from any of the other components such as the front-end processing units 205/207, the central processing and measurement units 210/212, and the measure tile displays 220/225. The monitor central control unit 127 controls the operational aspects of the components of the waveform monitor 105 such as the front-end processing units 205/207, the central processing and measurement units 210/212, and the measure tile displays 220/225.

The display unit 130 including the display 135 provides measurement information or other visual results about the video signals to the operator of the waveform monitor 105. The display 135 can be visually divided into separate tiles, such as tiles 1, 2, 3, and 4. Each tile is structured to respectfully display one of the video signals associated with one of the channels. Alternatively, a single tile can be displayed with multiple input signals simultaneously displayed within the single tile.

The synchronization control unit 125 intercepts and synchronizes control information 250 to other components of the waveform monitor 105 such as the front-end processing units 205/207, the central processing and measurement units 210/212, and the measure tile displays 220/225 when the synchronization view enable preference 260 is selected by the operator. Otherwise, if the synchronization view disable preference 270 is selected by the operator, then the synchronization control unit 125 does not regulate or modify the control and measurement data of the waveform monitor.

An operator of the waveform monitor 105 can select from a variety of synchronized measurement views such as a waveform measurement view 280 for analyzing a voltage versus time display, a vector measurement view 282 for plotting chrominance information, a picture measurement view 284 for providing direct visualization of the video content, a gamut measurement view 286 for visualizing legal color space, a status and session measurement view 288 for providing textual information including the reporting and summarizing of certain states and statistics about the input video signals, a datalist measurement view 290 for showing portions of the digital content of the video signals and including alpha-numeric data describing the digital content of the video signals, and an eye and jitter measurement view 292 including plots of voltage versus time of the physical transmission of the video signals, among other suitable measurement views.

Figure 3:
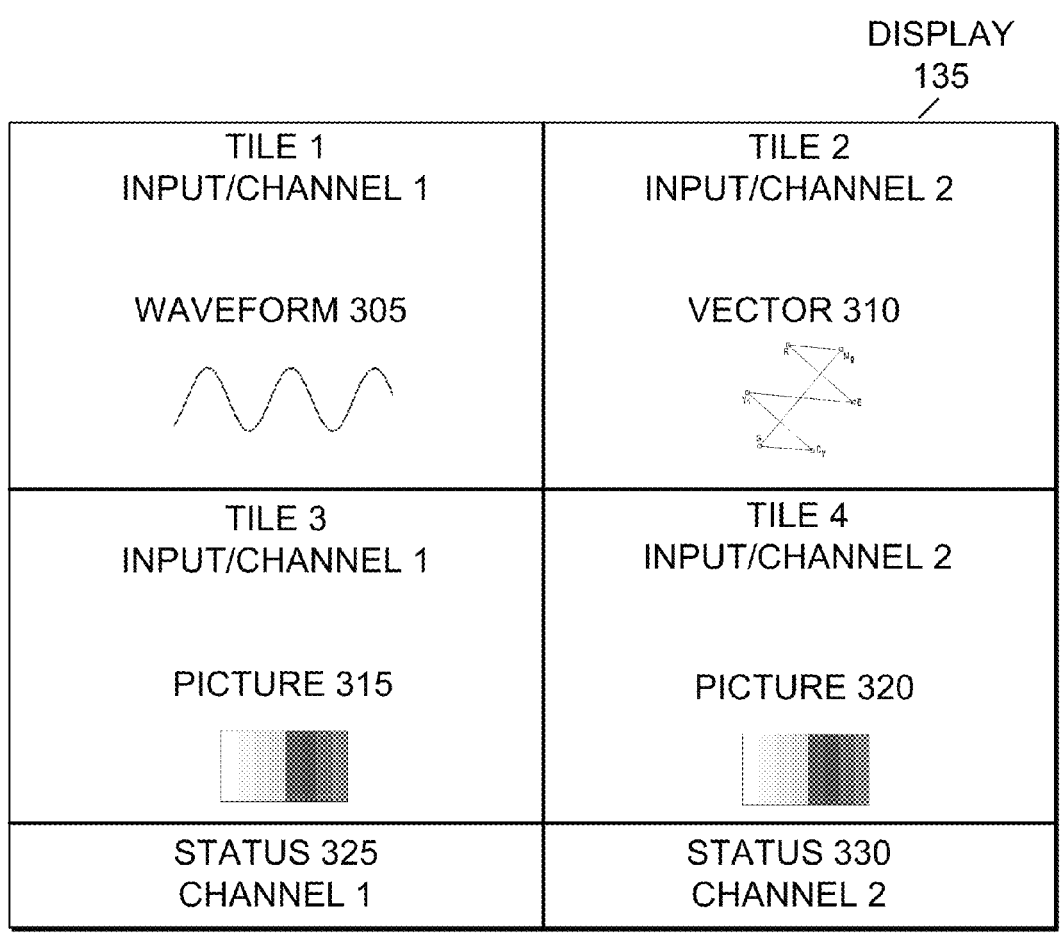
FIG. 3 illustrates a somewhat schematic arrangement of the display visually divided into four different tiles with each tile respectfully displaying a measurement view associated with a video signal.

FIG. 3 illustrates a simplified schematic arrangement of the display 135 visually divided into four different tiles 1, 2, 3, and 4 in a traditional or non-synchronous mode, with each tile displaying a measurement view 305, 310, 315, and 320, associated with a video signal. Generally, the tiles are equally allocated dimensionally, and each tile is associated with one of the available input signals and channels. The operator can assign a measurement view to each tile for each input signal and channel. One input signal can be shown in two different measurement views. For instance, the input signal associated with channel 1 can be simultaneously analyzed with the waveform measurement view 305 and the picture measurement view 315, while channel 2 is displayed on vector measurement view 310 and picture measurement view 320. Different configuration parameters for each display tile can be adjusted for each display tile. Status panels 325 and 330 can display status or other descriptive information about channels 1 and 2, respectively, or about the waveform monitor 105.

Figure 4:
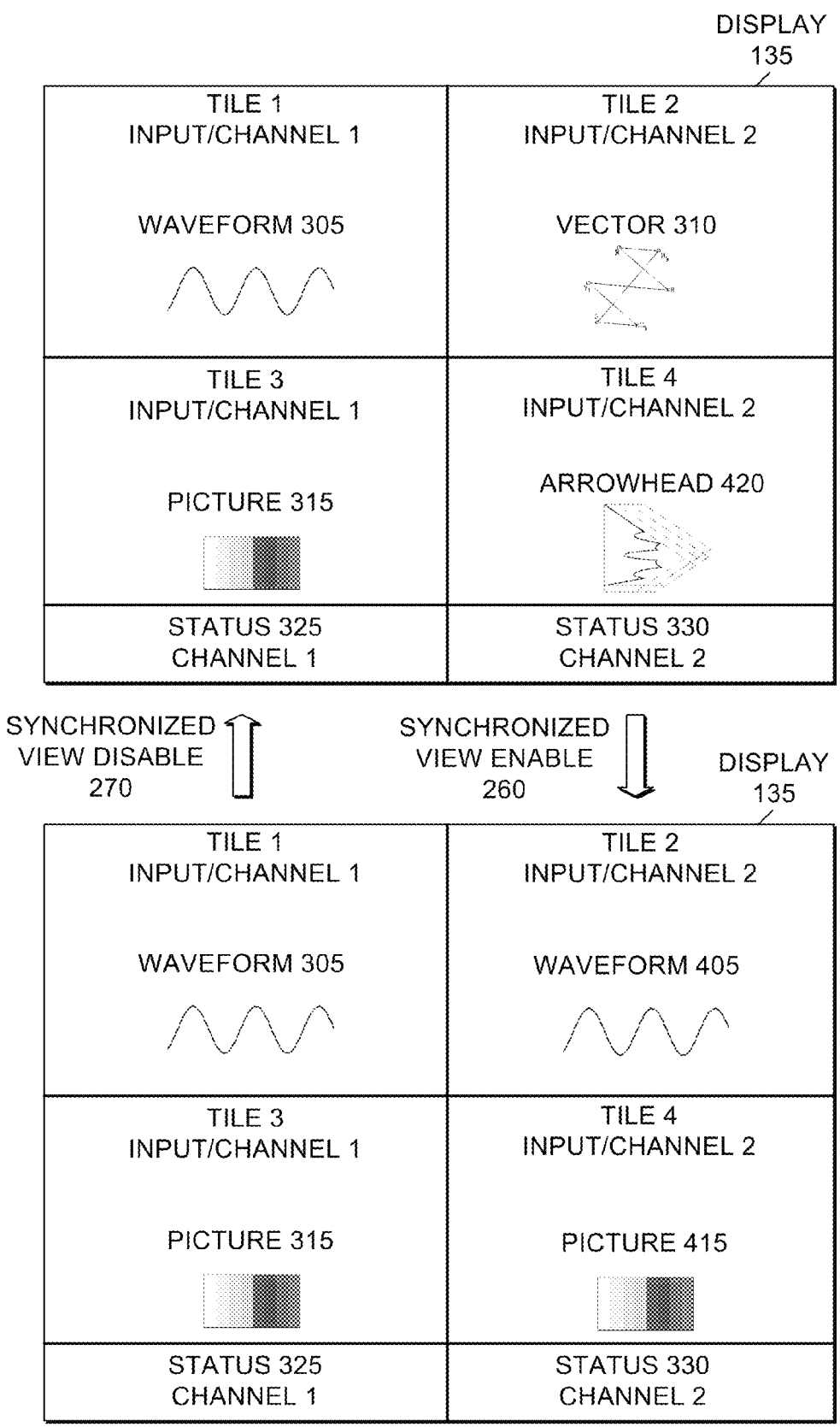
FIG. 4 illustrates a somewhat schematic view of the display of FIG. 3 in a synchronized view enabled mode and a synchronized view disabled mode according to some embodiments of the invention.
Figure 5A:
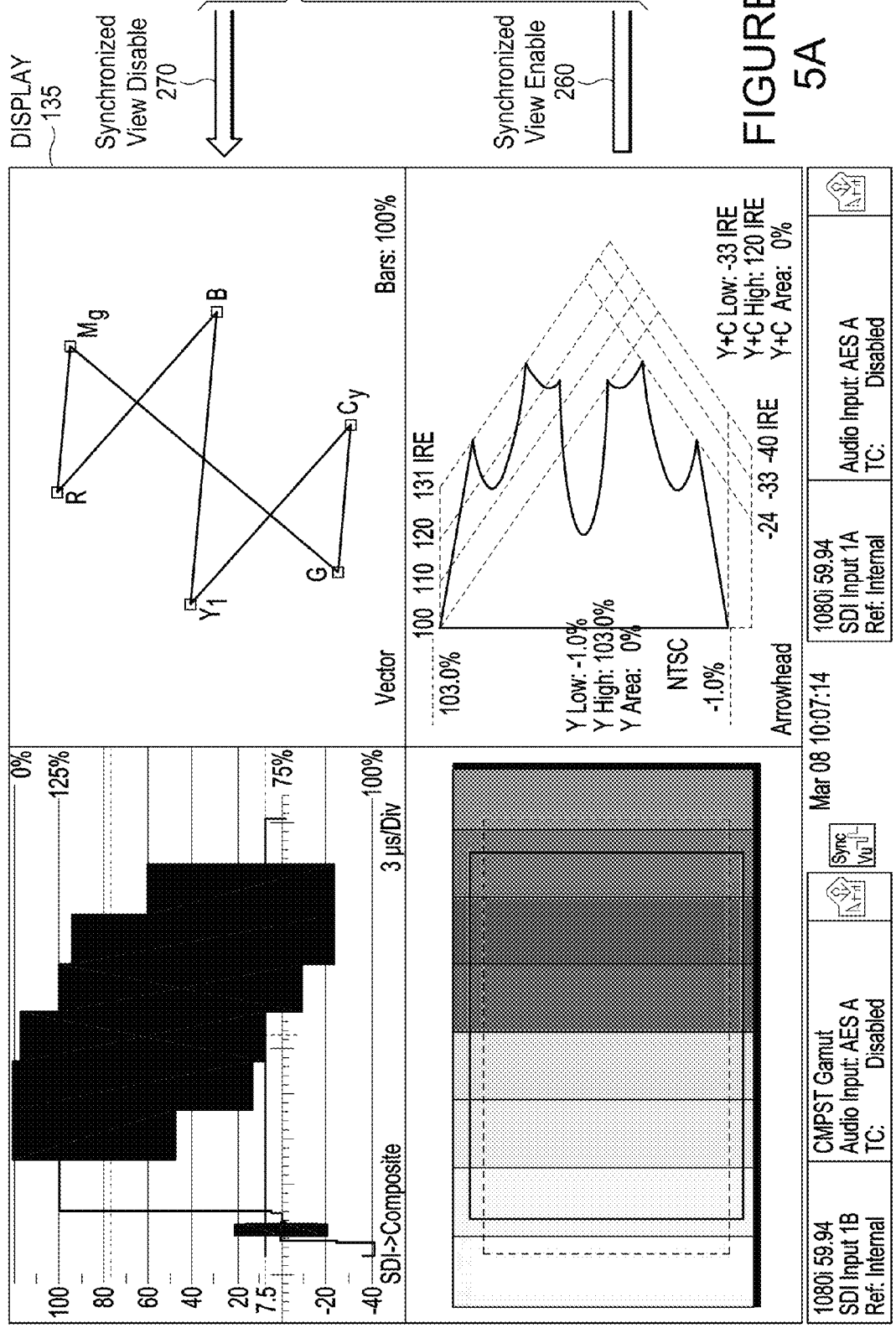
FIG. 5 illustrates an example embodiment of the synchronized view enabled mode and the synchronized view disabled mode.
Figure 5B:
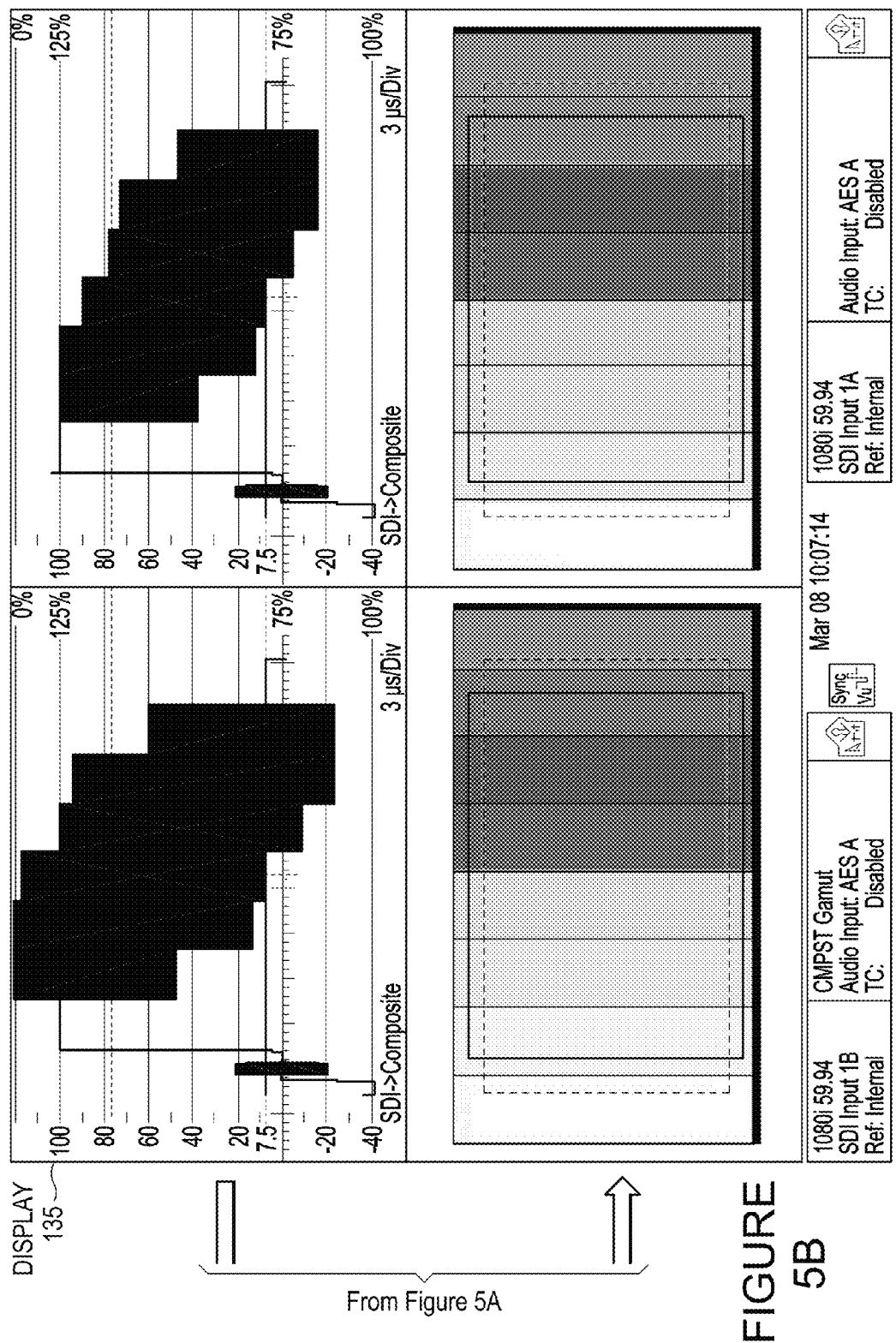

FIG. 4 illustrates a simplified schematic view of the display 135 of FIG. 3 in a synchronized view enabled mode 260 and a synchronized view disabled mode 270 according to some embodiments of the invention. FIG. 5 also illustrates an example embodiment of the synchronized view enabled mode 260 and the synchronized view disabled mode 270. The description now proceeds with reference to FIGS. 4 and 5.

In a traditional mode, or after receiving a synchronized view disable preference 270 from the operator of the waveform monitor, tiles 1, 2, 3, and 4 essentially operate independently of one another. Put differently, the operator assigns different measurement views one at a time to each of the tiles of the display 135, such as the waveform measurement view 305 for tile 1 channel 1, the vector measurement view 310 for tile 2 channel 2, the picture measurement view 315 for tile 3 channel 1, and the gamut (e.g., arrowhead) measurement view 420 for tile 4 channel 2. A first video signal is associated with channel 1 and a second video signal is associated with channel 2. The operator independently adjusts configuration parameters for each tile individually, typically one at a time when in the traditional mode.

When the synchronized view enable preference 260 is received from the operator via the user control interface, for example when the operator presses a synchronization button, the synchronization control unit 125 (of FIGS. 1 and 2) engages and synchronizes the measurement view of one channel with that of another. One of the channels is used as a template to set up one or more other channels. For example, one input signal (associated with channel 2) can be synchronized with another input signal (associated with channel 1). Put differently, if a waveform measurement view 305 is on video input 1, then an identical waveform measurement view 405 is configured and displayed for video input 2. That is, tiles 1 and 2 are synchronized. Further, some or all of the configuration parameters assigned to video input 1 are automatically assigned or replicated to video input 2. For instance, if video input 1 is configured with line selection on field 1 and line 21, then video input 2 is automatically configured with line selection on field 1 and line 21 when the synchronization view is enabled. As another example, if a picture measurement view 315 is on video input 1 having closed caption decoding and display on channel 1, then the video input 2 is automatically assigned the picture measurement view 415 having closed caption decoding and display on channel 1 as well. In this manner, the measurement views and configuration parameters of tiles 3 and 4 are synchronized. Thus, the measurement views and/or configuration parameters are replicated between the channels based on whether the synchronized view is enabled or disabled.

Once the synchronized view enable preference 260 is received from the operator and the synchronization is engaged, the measurement views and configuration parameters of one input signal/channel are synchronized (i.e., replicated) to another input signal/channel. The synchronized mode is maintained by replicating any additional configuration parameters that are designated by the operator through the user control interface. For example, if video input 1 is subsequently configured to strip EAV/SAV/ANC (i.e., end of active video, start of active video, ancillary data), then the EAV/SAV/ANC for input 2 is also stripped. Similarly, in some embodiments, all other monitoring channel-specific settings on channel 1 will be duplicated to channel 2.

As illustrated in FIGS. 4 and 5, measurement views are mirrored from channel 1 (the tiles located on the left of the display 135) to channel 2 (the tiles located on the right of the display 135). In the synchronized mode, the waveform measurement view 305 of tile 1 is assigned or otherwise replicated as waveform measurement view 405 of tile 2. The configuration parameters for tile 1 waveform display on input 1, such as waveform mode, sweep, color component, filter, position, gain, magnification, position, cursor, line select, etc., are replicated or otherwise cloned for tile 2 waveform display on input 2. Similarly, the picture measurement view 415 of tile 4 is cloned with the picture measurement view 315 of tile 3, along with some or all of the configuration parameters such as closed caption (CC) channel, safe area, line select, and so forth.

As mentioned above, the synchronized mode is maintained by duplicating adjustments to configuration parameters for one input, one channel, or a measurement view, to another input, channel, or measurement view. As another example, changing sweep from line to field on the tile 1 waveform of input 1 will also set the waveform in tile 2 of input 2 to field sweep rate. In yet another example, a cursor is linked between the tiles so that if the cursor is moved for one tile, such as by a pointing device or direction pad, it is moved in a similar fashion in the other tile. Similarly, the cursor in one tile can be offset in position from the cursor in another tile, but otherwise synchronized so that a movement to one cursor in one tile causes the other offset cursor in the other tile to move in a relative or "lock-step" fashion.

Synchronization can occur in both time and space. An example of time-based synchronization includes log sessions, which can be reset at a particular moment in time in a synchronized fashion. For example, if an error log is reset for one channel, the error log for another channel can be likewise simultaneously reset so that the duration of the logs are synchronized and begin at the same time. This allows the operator to investigate a certain event that might have occurred at a particular location in the log file for both channels. Another time-based synchronization includes, for example, an accumulation of histograms such as an "infinity" accumulation over time of an eye and jitter measurement view of the video signal. In yet another example, audio sessions can be synchronized across different channels.

An example of space-based synchronization includes mirroring the measurement views of the video signals such as the waveform or vector measurement views, and analyzing the location and physical characteristics of the video signals themselves. This allows the operator to discern whether two different input signals are different from each other, even by a single bit of data. Another example of space-based synchronization is the "page-down" or "page-up" configuration parameters, which can cause alpha-numeric or digital information displayed in one tile to be "locked" in space to similar alpha-numeric or digital information displayed in another tile. In other words, the graphical view of the information can be coordinated among the various channels. Other configuration parameters such as gain, position, line select, and so forth, can also be synchronized.

It should be understood that the arrangement of the tiles and synchronization between the tiles is not limited to the arrangement specifically illustrated. In other words, any arrangement of the tiles and any synchronized grouping of tiles can be implemented. For instance, in some embodiments, a tile to tile pairing is defined so that changes in one tile will be duplicated to the other tile of the pair. Alternatively, a group of tiles are linked to each other so that a change in any one tile is duplicated to all other tiles in the group. In yet another example embodiment, all tiles are linked to each other so that a change in any tile is duplicated to all other tiles.

While the synchronization mode is useful for multiple inputs having the same video format, embodiments of the invention also include disparate formats. For example, at an up-conversion facility, a standard definition (SD) video signal and a high definition (HD) video signal can be simultaneously displayed and synchronized according to the example embodiments disclosed herein. In this scenario, additional processing can be applied to accommodate the differences in the video formats. For instance, in a line select mode, the line is mapped to be the same location in the raster, so that the same picture elements are shown on each format. The replication of one or more configuration parameters between the SD and HD formats can include an adjustment based on a percentage difference between the SD video signal and the HD video signal, such as when moving a cursor vertically or horizontally. Some configuration parameters can be specifically selected not to be synchronized such as format selection or alarming. The operator can independently choose some categories or configuration parameters that are not synchronized between the various video formats. Other formats can be used such as 3 Gb, digital cinema, or graphics formats having various resolutions and display rates, among other suitable formats.

Three-dimensional television (3D-TV) projects stereoscopic image pairs to the viewer. One video component is intended for the left eye and another video component for the right eye. Embodiments of the invention discussed herein are useful for simultaneously analyzing and comparing a first signal that includes a first component of the 3D-TV video signal and a second signal that includes a second component of the 3D-TV video signal. Measurement views and configuration parameters of the components of the 3D-TV video signal can be synchronized, thereby facilitating efficient comparison and analysis of the 3D-TV signal.

In some example embodiments, when one channel is associated with an external reference signal, another channel that is synchronized can automatically be associated with the same external reference signal.

Any one of the tiles 1, 2, 3, or 4 can be enlarged so that the tile fills the display 135 even while maintaining the synchronization of the measurement views and configuration parameters between the tiles.

When the operator indicates the synchronization view disable preference 270, such as by selecting a 'synchronize off' button, or pointer select, the synchronization mode becomes disengaged, and the operation returns to a traditional mode where the settings on each tile can be changed independently.

Figure 6:
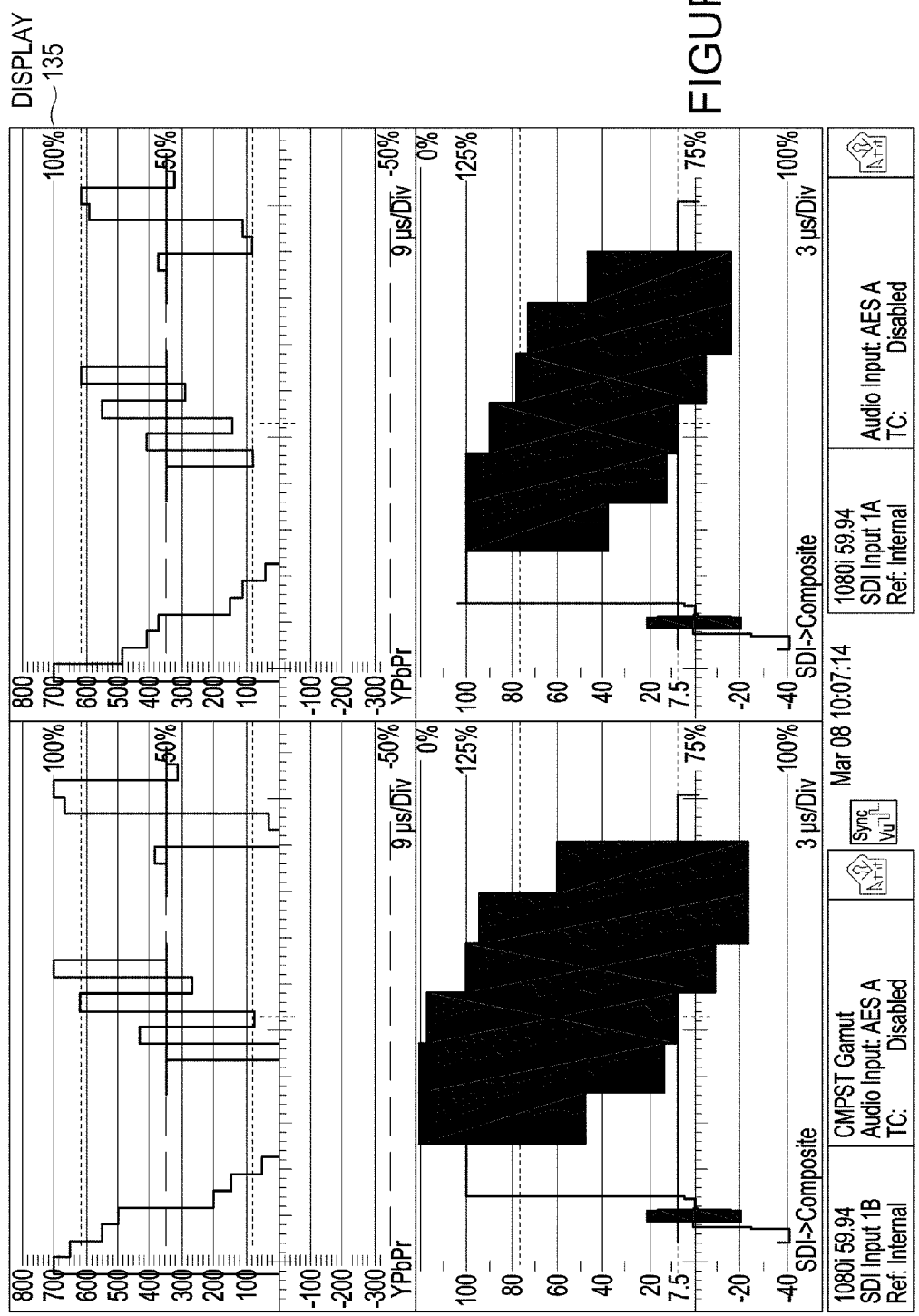
FIG. 6 illustrates an example embodiment showing a waveform display measurement view of video signals in various tiles of the display.

FIG. 6 illustrates an example embodiment showing a waveform display measurement view of video signals in various tiles of the display 135 in a synchronization-view mode. The waveform display measurement view provides a voltage versus time display of the video signal. Configuration parameters for this measurement view include, for example, a waveform position, a display style, a filter parameter, a line selection, a sweep parameter, a gain parameter, a voltage cursor, and a time cursor, among other suitable settings. Voltage and time cursors can be used for measuring voltage/time between waveform features. In this example embodiment, a YPbPr aspect of the waveform measurement view is displayed with two different video input signals side-by-side in the top two tiles, and an SDI→Composite aspect of the waveform measurement view is displayed in the bottom two tiles with the two different video input signals side-by-side.

Figure 7:
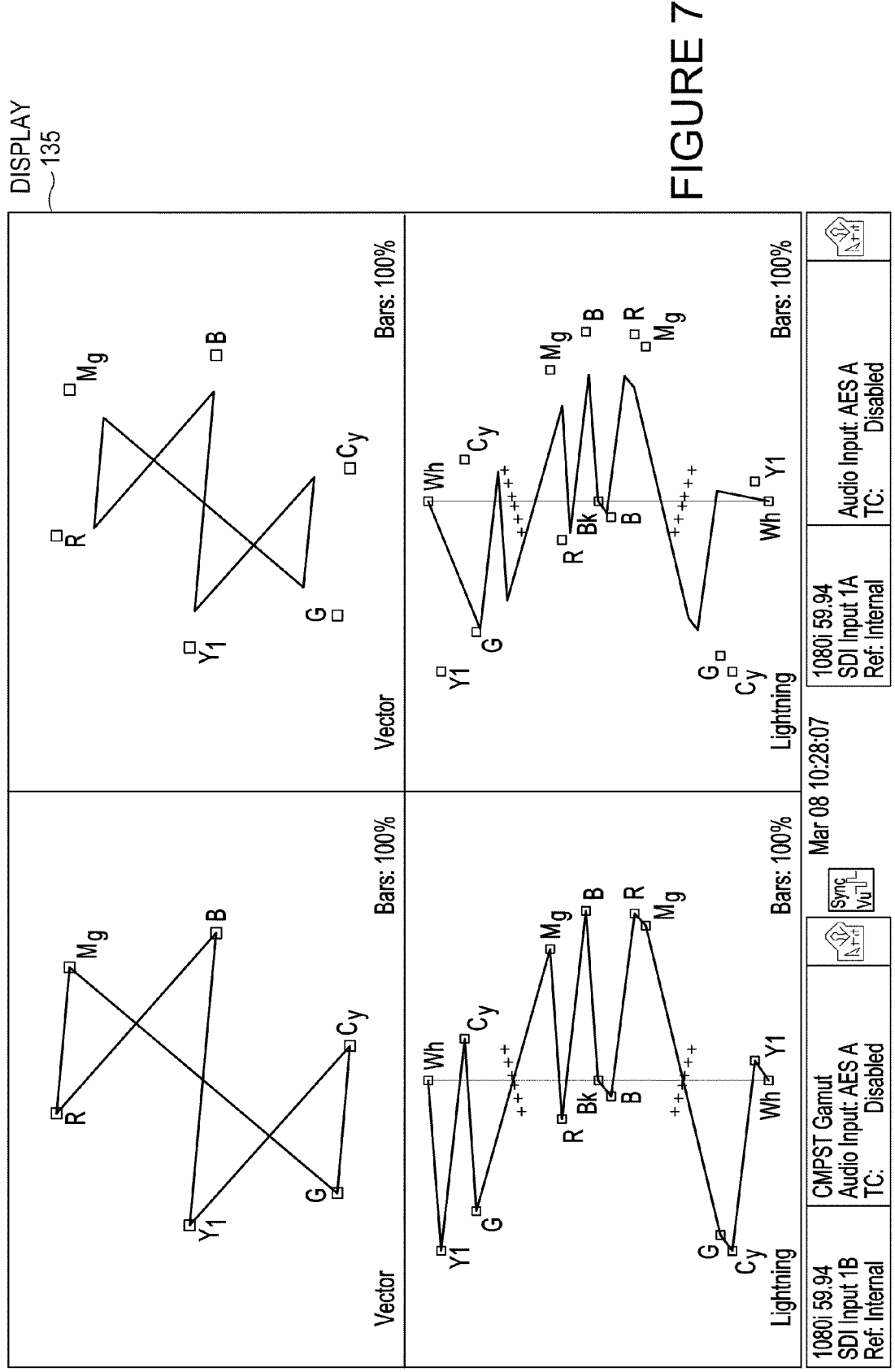
FIG. 7 illustrates an example embodiment showing a vector and lightning display measurement view of video signals in various tiles of the display.

FIG. 7 illustrates an example embodiment showing a vector and lightning display measurement view of video signals in various tiles of the display 135 in a synchronization-view mode. Vector displays or lightning displays provide a technique for plotting luminance and/or chrominance information. Configuration parameters for this measurement view include, for example, a line selection, a gain parameter, a display style, and a vector position control, among other suitable settings. In this example embodiment, a vector aspect of the measurement view is displayed with two different video input signals side-by-side, and a lightning aspect of the measurement view is displayed with the two different video input signals side-by-side.

Figure 8:
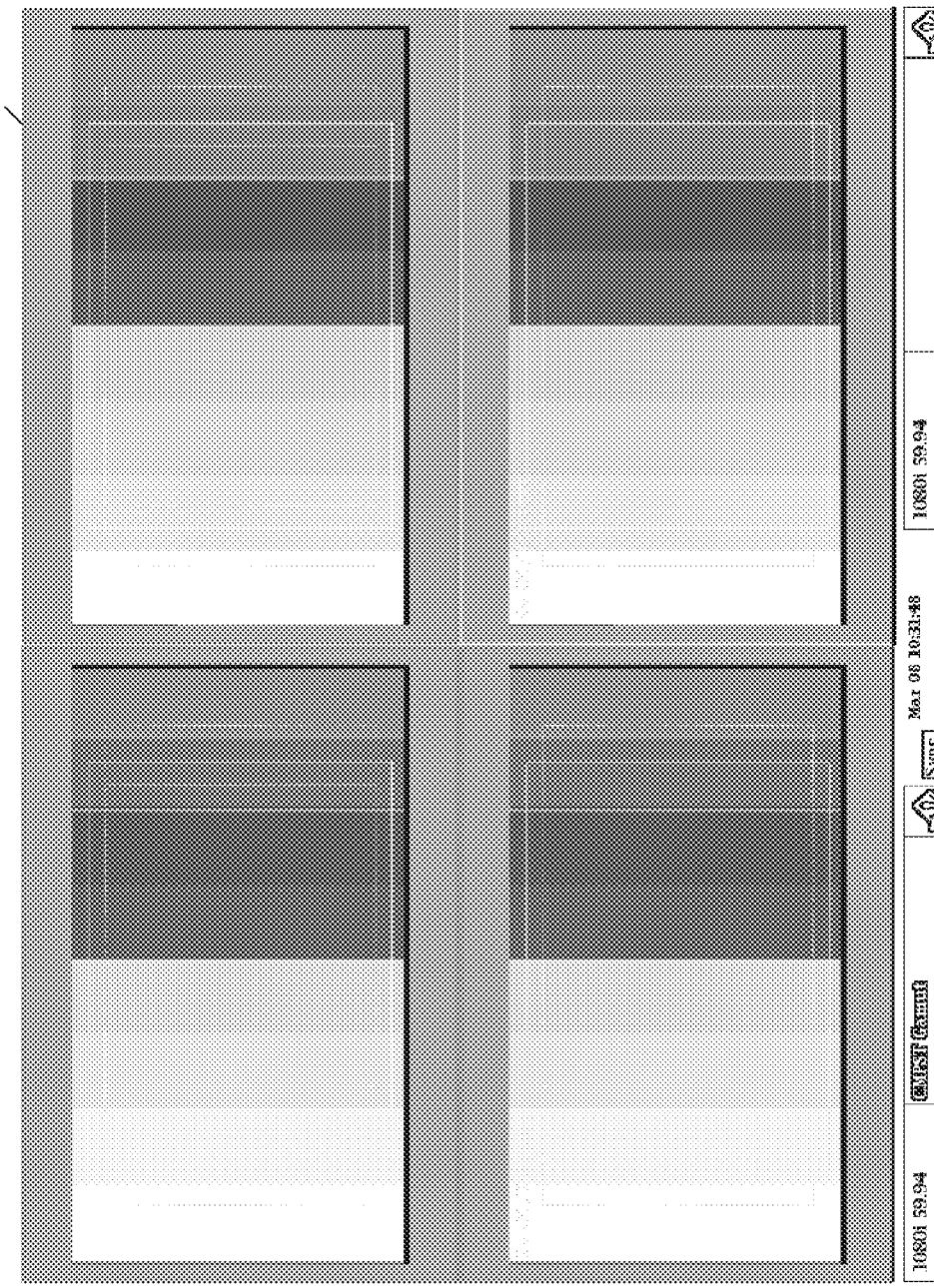
FIG. 8 illustrates an example embodiment showing a picture display measurement view of video signals in various tiles of the display.

FIG. 8 illustrates an example embodiment showing a picture display measurement view of video signals in various tiles of the display 135 in a synchronization-view mode. The picture measurement view provides direct visualization of the video content. Configuration parameters for this measurement view include, for example, a closed caption display parameter and a safe area graticules parameter, among other suitable settings. In this example embodiment, safe area graticules are displayed with two different video input signals side-by-side, and closed caption monitoring can be displayed with the two different video input signals side-by-side.

Figure 9:
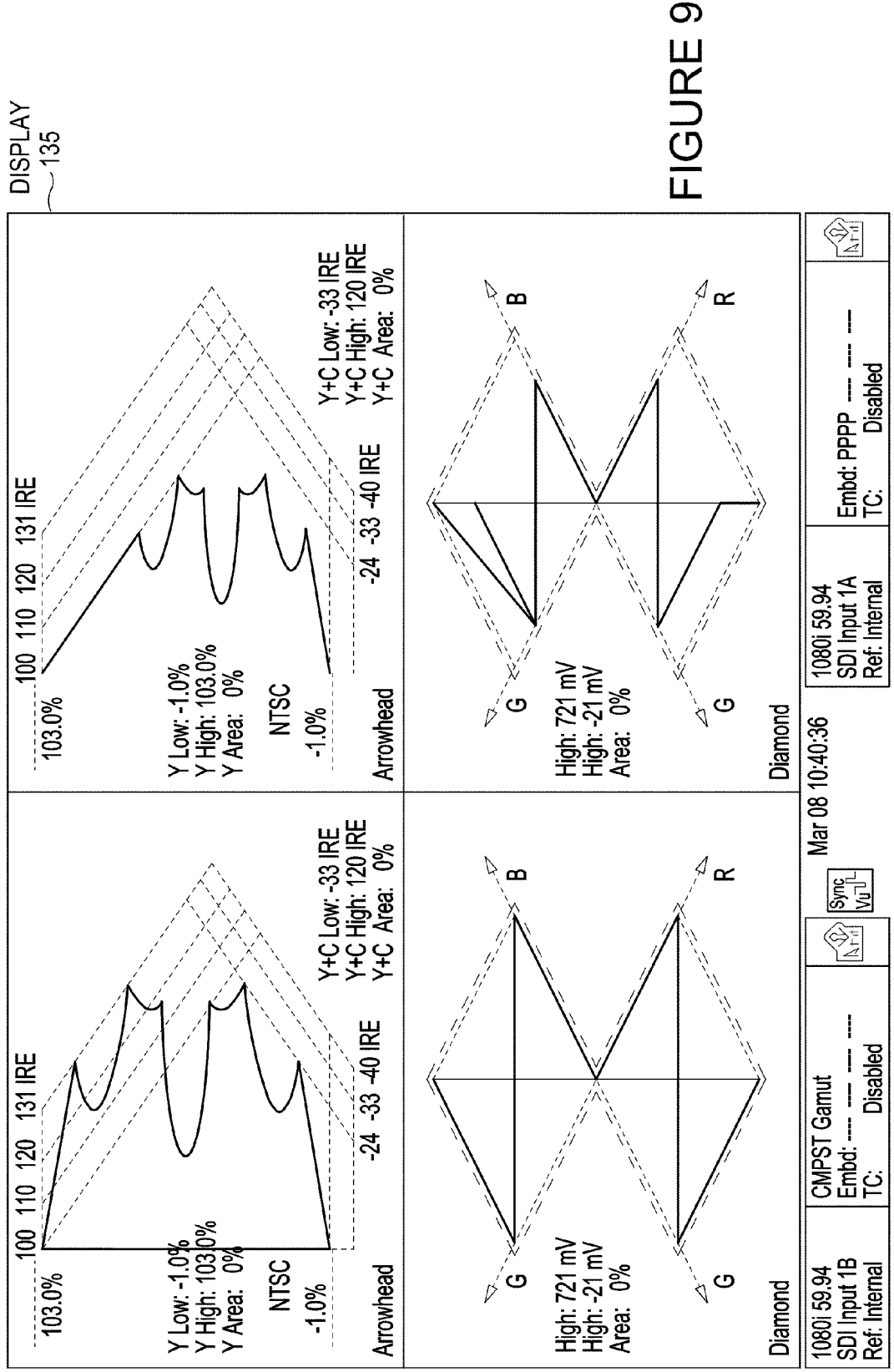
FIG. 9 illustrates an example embodiment showing a gamut display measurement view of video signals in various tiles of the display.

FIG. 9 illustrates an example embodiment showing a gamut display measurement view of video signals in various tiles of the display 135 in a synchronization-view mode. The gamut display measurement views include various measurement displays such as arrowhead, diamond, split-diamond, and spearhead. These are used to analyze "legal" color space. Configuration parameters for this measurement view include, for example, thresholds, among other suitable settings. In this example embodiment, arrowhead displays for two different video input signals are placed side-by-side in the top tiles, and diamond displays are placed with the two different video input signals side-by-side in the bottom tiles.

FIG. 10 illustrates an example embodiment showing a status and session display measurement view of video signals in various tiles of the display 135 in a synchronized-view mode. The status and session measurement view includes alpha-numeric information representing, for example, an error log, an alarm status, a video session, an audio session, an audio control, a channel status, an auxiliary data status, a serial digital interface (SDI) status, and an ancillary data display, among other suitable information. Configuration parameters for this measurement view include, for example, a start control, a pause control, a stop control, a reset control, and a page selection, among other suitable settings. In this example embodiment, video sessions are displayed with two different video input signals side-by-side in the top tiles, and error logs are displayed with the two different video input signals side-by-side in the bottom tiles.

Figure 11:
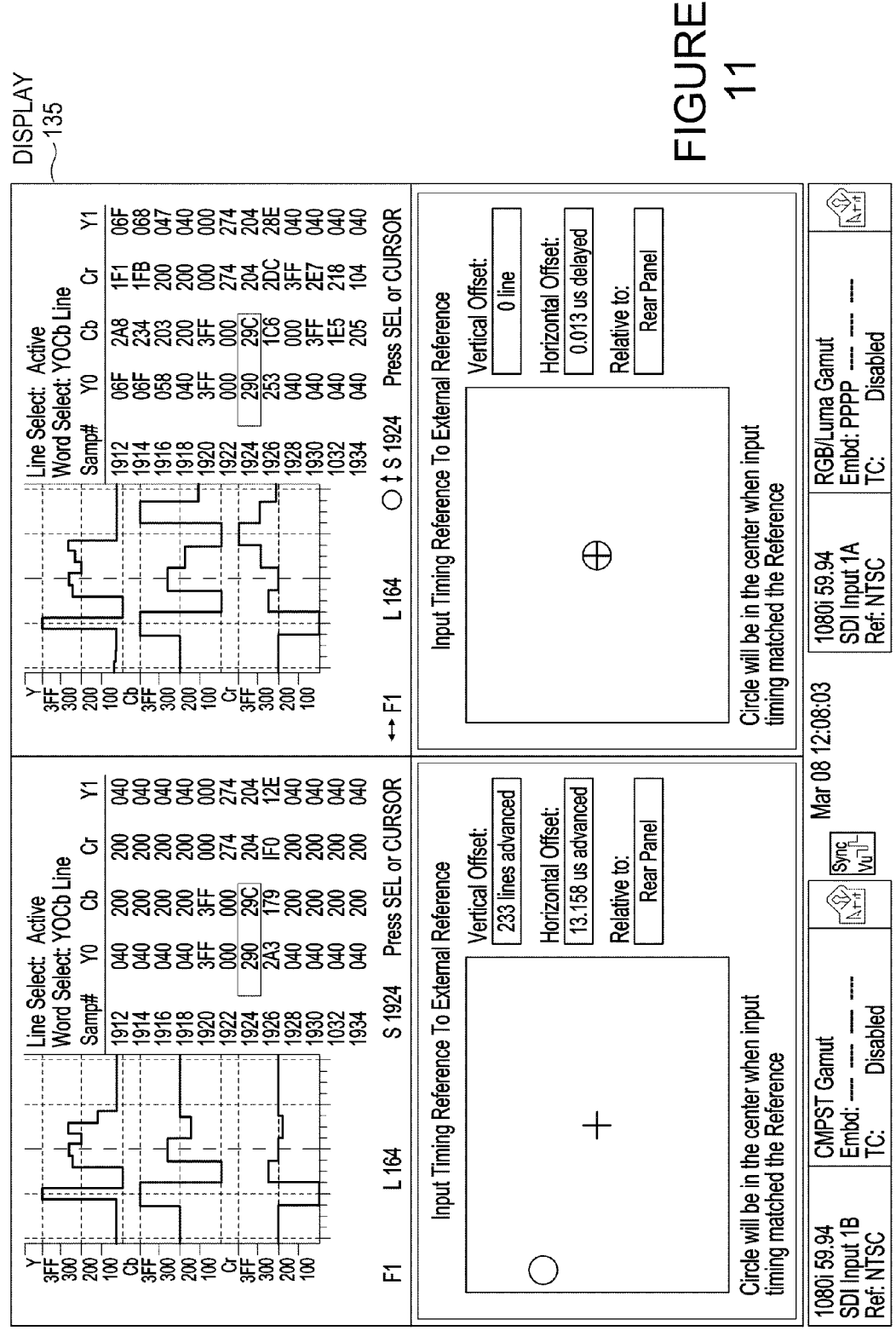
FIG. 11 illustrates an example embodiment showing a datalist and a timing display measurement view of video signals in various tiles of the display.

FIG. 11 illustrates an example embodiment showing a datalist and timing display measurement view of video signals in various tiles of the display 135 in a synchronized-view mode. The datalist and timing display measurement view shows the digital content of the video signals, including alpha-numeric data describing the digital content of the video signals. Configuration parameters for this measurement view include, for example, a line select, a sample select, and a zoom control, among other suitable settings. In this example embodiment, datalist displays are displayed with two different video input signals side-by-side in the top tiles, and timing reference displays are displayed with the two different video input signals side-by-side in the bottom tiles—showing a timing difference of the two video signals against an external reference. Timing reference displays allow the operator to measure video signal timing against external reference or other video inputs. Configuration parameters for the timing reference display include, for example, reference source and offset selection.

Figure 12:
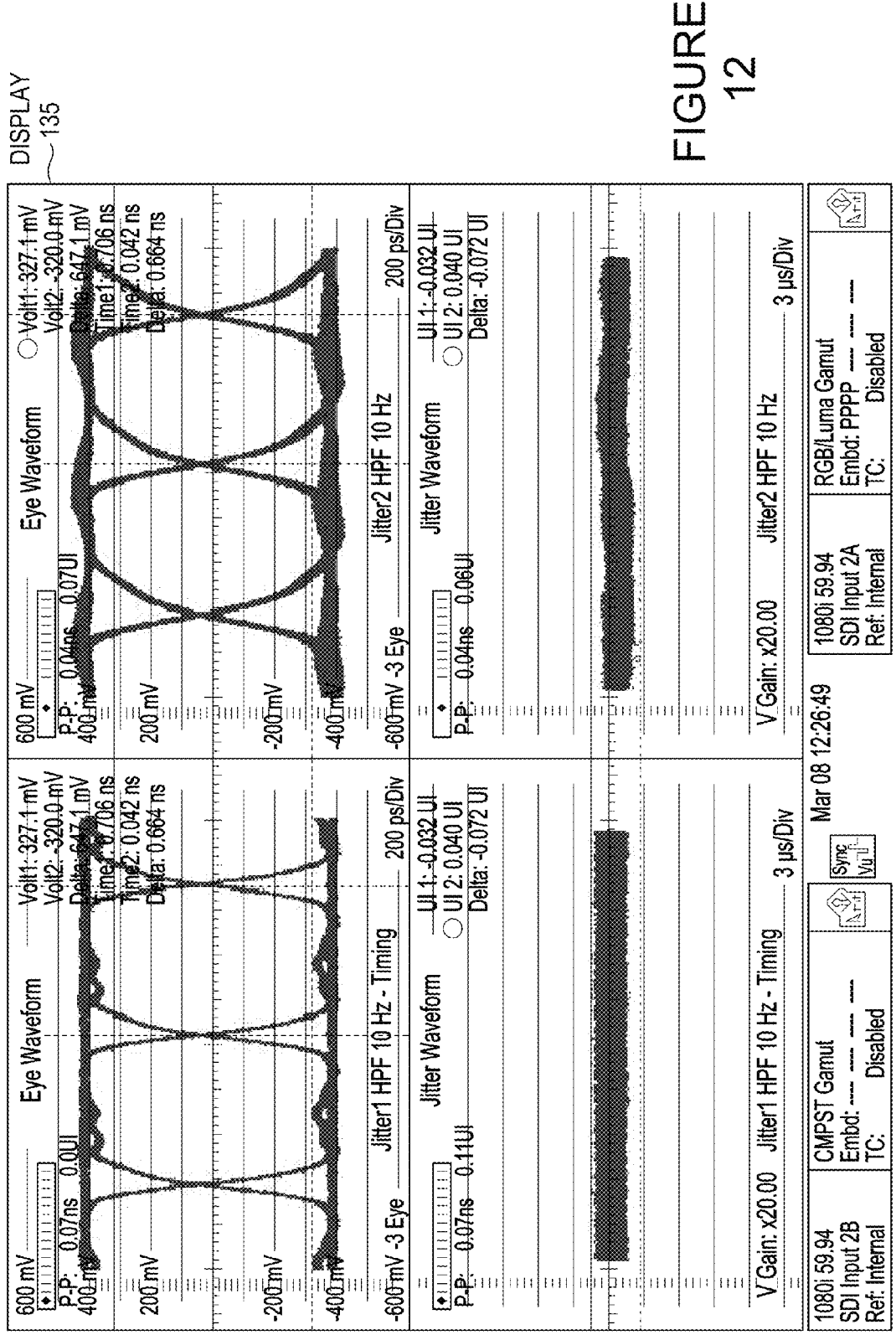
FIG. 12 illustrates an example embodiment showing an eye and jitter display measurement view of video signals in various tiles of the display.

FIG. 12 illustrates an example embodiment showing an eye and jitter display measurement views of video signals in various tiles of the display 135 operating in a synchronized-view mode. The eye and jitter display measurement views are plots of the voltage or jitter versus time of the physical transmission of the video signals. Configuration parameters include, for example, a gain parameter, a sweep parameter, a high-pass filter parameter, a voltage cursor, and a time cursor, among other suitable settings. In this example embodiment, eye displays are displayed with two different video input signals side-by-side, and jitter displays are displayed with the two different video input signals side-by-side.

Figure 13:
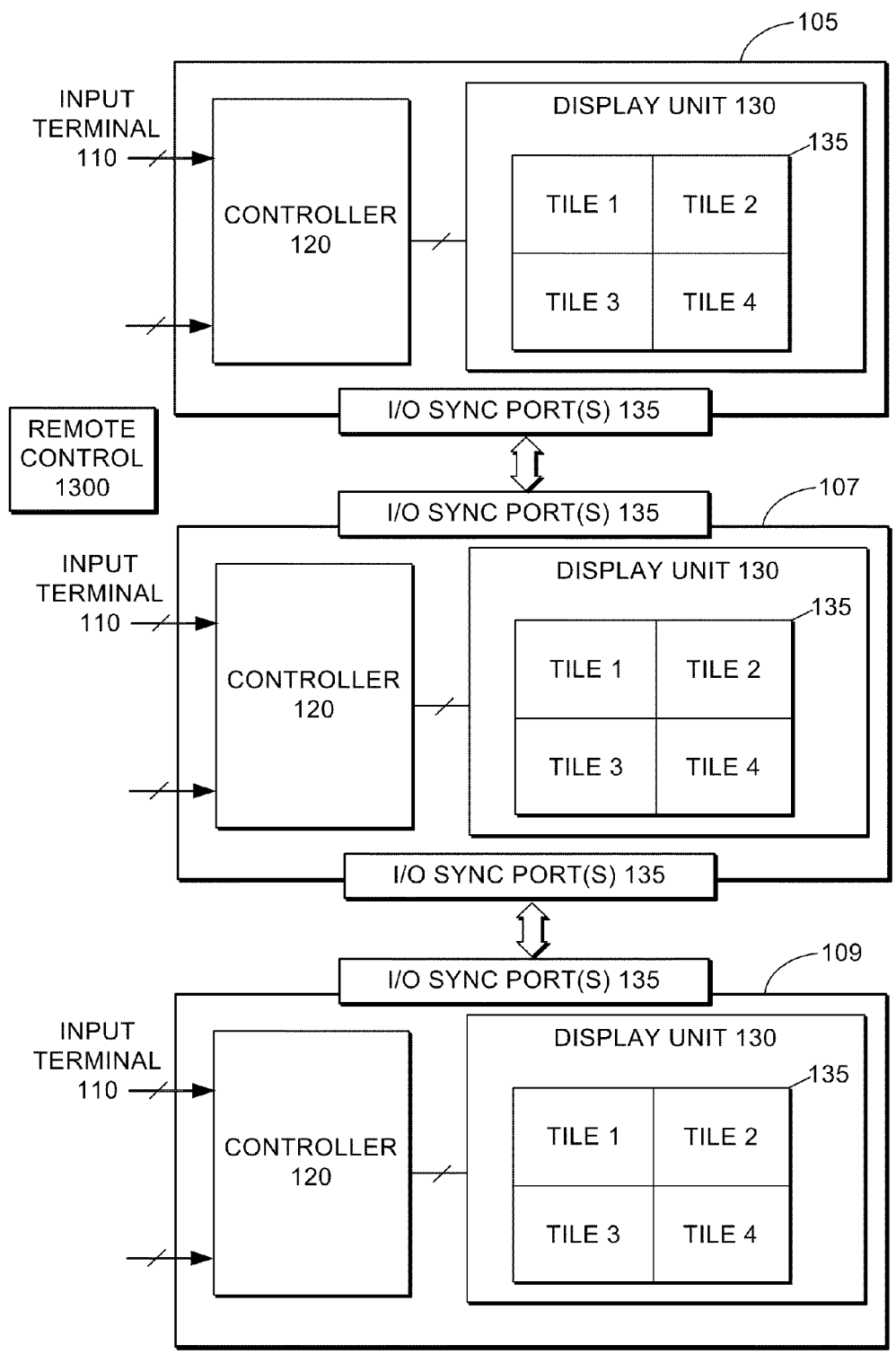
FIG. 13 illustrates a block diagram of multiple test and measurement instruments having synchronization inputs and synchronization outputs for synchronizing measurement views and configuration parameters among the test and measurement instruments.

FIG. 13 illustrates an example block diagram of multiple test and measurement instruments 105, 107, and 109 having synchronization inputs 135 and synchronization outputs 135 for synchronizing measurement views and configuration parameters among the different test and measurement instruments according to embodiments of the invention. Two or more waveform monitors such as 105, 107, and/or 109 can be synchronized using techniques similar to those described above, except that multiple displays from multiple devices are involved. In other words, measurement views and configuration parameters can be synchronized between the waveform monitors 105, 107, and/or 109 using a synchronization signal that is transmitted from, for instance, a synchronization output 135 of one waveform monitor to a synchronization input 135 of another waveform monitor.

In some embodiments, each tile 1 from each waveform monitor is synchronized to have the same measurement view and configuration parameters, each tile 2 from each waveform monitor is synchronized in a similar fashion, etc. Alternatively, tiles from different waveform monitors can have independently configured measurement views and can have one or more of the configuration parameters replicated in a synchronized-view mode. In yet another example embodiment, tiles from different waveform monitors can have independently selected configuration parameters and can have the measurement views synchronized.

Synchronization among the multiple waveform monitors can be engaged responsive to operator input received via the user control interface of one or more of the waveform monitors. Alternatively, a remote control or interface 1300 can be used to configure and engage, maintain, or disengage the synchronization of the waveform monitors.

Figure 14:
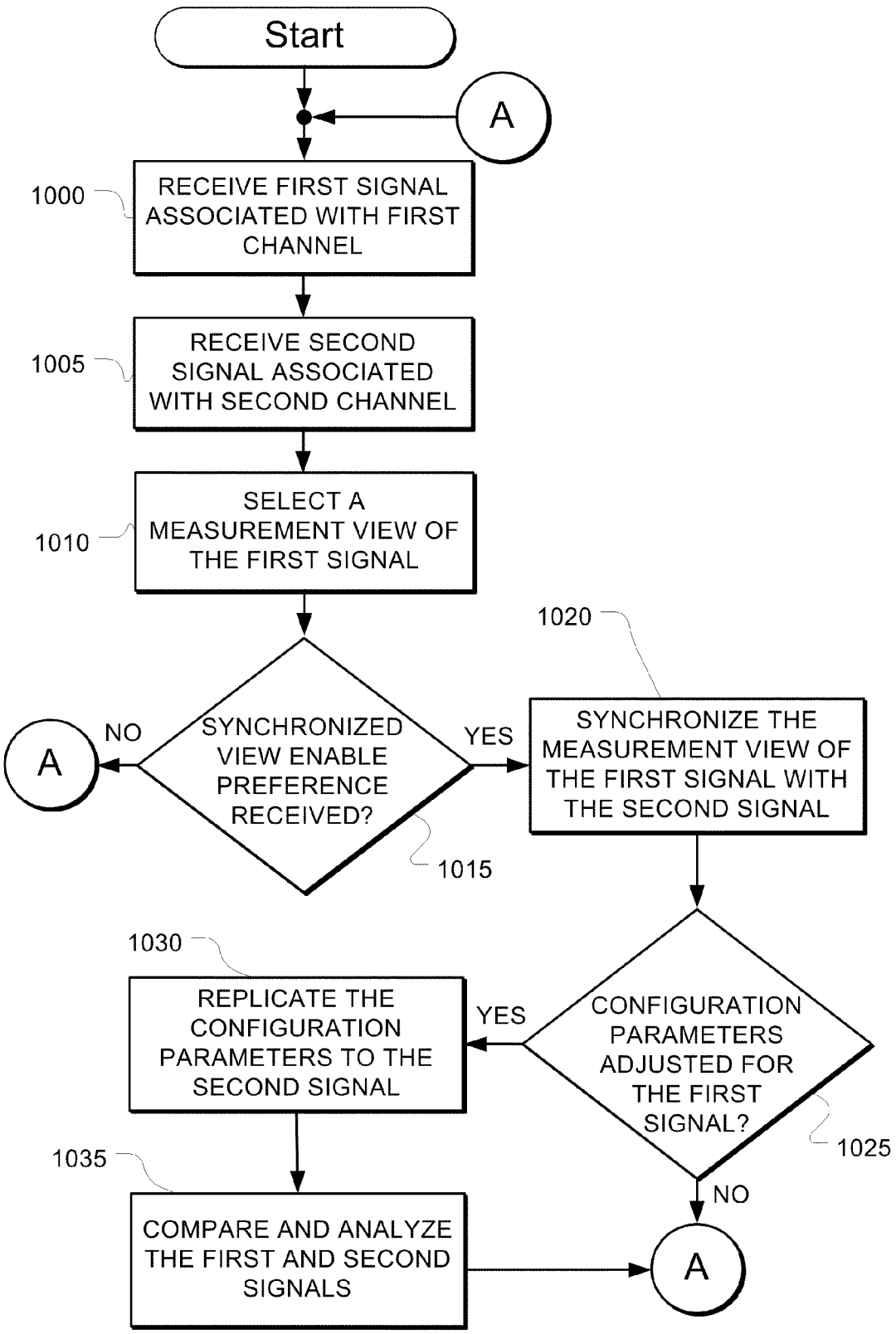
FIG. 14 illustrates a flow diagram showing a technique for synchronizing the measurement view and configuration parameters across multiple video signals.

FIG. 14 is an example flow diagram illustrating a technique for synchronizing the measurement view and configuration parameters across multiple video signals according to embodiments of the invention. At 1000, a first signal under test associated with a first channel of a waveform monitor is received. At 1005, a second signal under test associated with a second channel of the waveform monitor is received. It should be understood that the arrangement of the blocks of the flow diagram need not be performed in the order shown, and indeed, some of the blocks can be performed simultaneously such as the receiving of signals under test at 1000 and 1005.

An action can be received at 1010 to select a measurement view of the first signal associated with the first channel. At 1015, a determination is made whether a synchronized view enable preference has been received from the operator, such as, for example through the user control interface. If NO, meaning the synchronized-view mode is not selected, the flow proceeds through circle A to continue receiving the first and second signals under test. If YES, meaning the synchronized view mode is selected, the flow proceeds to 1020 and the measurement view of the first signal is synchronized with the second signal. Next, a determination is made at 1025 whether input has been received through the user control interface for adjusting one or more configuration parameters of the first signal associated with the first channel. If YES, the flow proceeds to 1030 and the one or more configuration parameters are replicated to the second signal associated with the second channel. The signals under test can then be compared and analyzed at 1035. If NO, the flow proceeds through circle A to continue receiving the first and second signals under test.

Some example embodiments disclosed herein can provide identical measurements and displays for multiple video inputs reliably and instantly. This provides easy and efficient comparison for multiple video signals, while avoiding the error-prone techniques of the conventional art. Moreover, example apparatuses and methods are disclosed to measure and view multiple video input signals using an easy-to-configure comparison mode. The example embodiments disclosed herein reduce the equipment and time required for video signal comparison situations, and improve the reliability for the measurement results and display comparisons.

Although particular embodiments have been described, it will be appreciated that the principles of the invention are not limited to those embodiments. In some embodiments, the first signal under test includes a standard definition video signal, the second signal under test includes a high definition video signal, and synchronizing the measurement view further includes replicating the measurement view and one or more configuration parameters of the first signal to the second signal. Replicating the one or more configuration parameters can include adjusting the configuration parameters based on a percentage difference between the standard definition video signal and the high definition video signal. In some embodiments, the first signal includes a first component of a three-dimensional video signal, the second signal includes a second component of the three-dimensional video signal, and synchronizing the measurement view further includes replicating the measurement view and one or more configuration parameters of the first component of the three-dimensional video signal to the second component of the three-dimensional video signal.

In some embodiments, the method includes receiving at least one of the synchronized view enable preference and a synchronized view disable preference from a user control interface. Synchronizing the measurement view can further include replicating the measurement view of the first signal to the second signal based on at least one of the synchronized view enable and disable preference.

In some embodiments, the method includes displaying the first signal with the first measurement view in a first tile of a display of the test and measurement instrument, displaying the second signal with a second measurement view in a second tile of the display of the test and measurement instrument, and after receiving the synchronized view enable preference from a user control interface, replacing the second measurement view in the second tile with the first measurement view responsive to the synchronized view enable preference.

In some embodiments, measurement views and/or configuration parameters are synchronized across multiple test and measurement instruments. As such, the display of each test and measurement instrument need not include more than one tile, but rather, the measurement views are synchronized across individual displays of each test and measurement instrument. Moreover, each of the test and measurement instruments can have a single input terminal associated with a single channel, and the measurement views and configuration parameters can be synchronized across the individual channels of each test and measurement instrument.

In some embodiments, the method includes enlarging one of the multiple tiles so that the tile fills the display while maintaining the synchronization of the measurement view between the tiles.

In some embodiments, the method includes displaying the first signal with the first measurement view in a first tile of a display of the test and measurement instrument, displaying the second signal with a second measurement view in a second tile of the display of the test and measurement instrument, displaying the first signal with a third measurement view in a third tile of the display of the test and measurement instrument, and displaying the second signal with a fourth measurement view in a fourth tile of the display of the test and measurement instrument. After receiving the synchronized view enable preference from a user control interface, the first and second tiles of the display are synchronized by replicating the first measurement view to the second signal in the second tile of the display responsive to the synchronized view enable preference. Similarly, the third and fourth tiles of the display are synchronized by replicating the third measurement view to the second signal in the fourth tile of the display responsive to the synchronized view enable preference.

In some embodiments, the method includes receiving a third signal under test associated with a first channel of a second test and measurement instrument, receiving a fourth signal under test associated with a second channel of the second test and measurement instrument, and synchronizing the measurement view with at least one of the third and fourth signal associated with the first and second channels, respectively, of the second test and measurement instrument.

In some embodiments, a test and measurement instrument includes a first input terminal to receive a first video signal associated with a first channel, a second input terminal to receive a second video signal associated with a second channel, a user control interface configured to receive input, a display to provide measurement information about the first and second video signals, and a synchronization control unit to synchronize a measurement view between the first and second video signals of the first and second channels, respectively, responsive to the input.

In some embodiments, the display is visually divided into at least two tiles. Each tile is structured to respectfully display one of the video signals associated with one of the channels. The synchronization control unit is configured to synchronize the measurement view between the at least two tiles.

In some embodiments, the input received through the user control interface includes a synchronized view enable preference, and the synchronization control unit is configured to synchronize the measurement view between the at least two tiles responsive to the synchronized view enable preference. The synchronization control unit can cause a synchronized accumulation of data over a period of time for both of the first and second channels.

In some embodiments, the measurement view is a waveform display mode; the one or more configuration parameters include at least one of a waveform position, a display style, a filter parameter, a line selection, a sweep parameter, a gain parameter, a voltage cursor, and a time cursor; and the synchronization control unit is configured to synchronize the waveform display mode and the one or more configuration parameters between the at least two tiles of the display.

In some embodiments, the measurement view is a vector display mode; the one or more configuration parameters include at least one of a line selection, a gain parameter, a display style, and a vector position control; and the synchronization control unit is configured to synchronize the vector display mode and the one or more configuration parameters between the at least two tiles of the display.

In some embodiments, the measurement view is a picture display mode; the one or more configuration parameters include at least one of a closed caption display parameter and a graticules parameter; and the synchronization control unit is configured to synchronize the picture display mode and the one or more configuration parameters between the at least two tiles of the display. The graticules parameter can include a safe area parameter.

In some embodiments, the measurement view is a gamut display view including at least one of an arrowhead, a diamond, a split-diamond, and a spearhead; the one or more configuration parameters include at least one threshold; and the synchronization control unit is configured to synchronize the gamut display mode and the one or more configuration parameters between the at least two tiles of the display.

In some embodiments, the measurement view is a status and session display view including textual information having at least one of an error log, an alarm status, a video session, an audio session, an audio control, a channel status, an auxiliary data status, a serial digital interface (SDI) status, and an ancillary data display; the one or more configuration parameters include at least one of a start control, a pause control, a stop control, a reset control, and a page selection; and the synchronization control unit is configured to synchronize the status and session display mode and the one or more configuration parameters between the at least two tiles of the display.

In some embodiments, the measurement view is a datalist display view including alpha-numeric data describing the digital content of the first and second video signals; the one or more configuration parameters include at least one of a line select, a sample select, and a zoom control; and the synchronization control unit is configured to synchronize the datalist display mode and the one or more configuration parameters between the at least two tiles of the display.

In some embodiments, the measurement view is an eye and jitter display view including plots of voltage or jitter versus time of transmissions of at least one of the first and second video signals; the one or more configuration parameters include at least one of a gain parameter, a sweep parameter, a voltage cursor, a high-pass filter parameter, and a time cursor; and the synchronization control unit is configured to synchronize the eye and jitter display mode and the one or more configuration parameters between the at least two tiles of the display.

In some embodiments, a test and measurement instrument includes a controller and a display, which is optionally visually divided into at least two tiles. Video signals are provided to the test and measurement instrument in which measurement aspects of the video signals are displayed in the tiles. The controller can synchronize a measurement view and one or more configuration parameters between the at least two tiles of the display. The system can include a second test and measurement instrument including a controller and a display, which is optionally visually divided into at least two tiles. Each of the first and second test and measurement instruments can include a synchronization input and/or a synchronization output.

In some embodiments, the controller of the first test and measurement instrument is configured to synchronize the measurement view and the one or more configuration parameters between the first test and measurement instrument and the second test and measurement instrument using a synchronization signal transmitted from the synchronization output of the first test and measurement instrument to the synchronization input of the second test and measurement instrument.

In some embodiments, the controller of the first test and measurement instrument is configured to synchronize the measurement view and the one or more configuration parameters between one tile of the first test and measurement instrument and another tile of the second test and measurement instrument using at least one of the synchronization input and output of each test and measurement instrument.

In some embodiments, a remote control external to the test and measurement instruments synchronizes the inputs and outputs between the test and measurement instruments.

Other variations and modifications may be made without departing from the principles of the invention as set forth in the following claims.

What is claimed is:

1. A method for synchronizing measurement views of a test and measurement instrument, the method comprising:
   receiving a first signal under test via a first channel of the test and measurement instrument;

receiving a second signal under test via a second channel of the test and measurement instrument;

displaying the first signal via a first measurement view in accordance with a first set of configuration parameters associated with the first signal and the second signal via a second measurement view in accordance with a second set of configuration parameters associated with the second signal;

receiving a synchronized view enable preference from a user control interface;

in response to the synchronized view enable preference, operating in a synchronized mode by: replicating a first subset of the first set of configuration parameters to a second subset, that corresponds with the first subset, of the second set of configuration parameters, and automatically reflecting subsequent changes made to the first subset in the second subset;

receiving a synchronized view disable preference from the user control interface; and in response to the synchronized view disable preference, operating in an unsynchronized mode by: automatically returning the second subset to an original state while maintaining a current state of the first subset, and disabling the automatic reflection of subsequent changes made to the first subset in the second subset.

2. The method of claim 1, wherein the first and second signals include video signals and the test and measurement instrument is a waveform monitor.

3. The method of claim 1, wherein:

the first signal includes a video signal having a first format; and the second signal includes a video signal having a second format, wherein the first format and the second format each represent a standard definition (SD) format, a high definition (HD) format, a 3 Gb format, a digital cinema format, or a graphics format, and wherein the first format is different from the second format.

4. The method of claim 1, wherein the first subset is based on synchronized configuration parameters that were designated by a user of the test and measurement instrument to be synchronized.

5. The method of claim 3, wherein replicating the first subset to the second subset includes automatically adjusting at least one configuration parameter of the second subset based on a percentage difference in resolution between the first format and the second format.

6. The method of claim 1, wherein:

the first signal includes a left eye component of a three-dimensional video signal; and the second signal includes a right eye component of the three-dimensional video signal.

7. The method of claim 1, wherein the first subset of the first set of configuration parameters comprises the first set of configuration parameters.

8. The method of claim 1 further comprising:

while operating in the unsynchronized mode, displaying the first signal via the first measurement view in a first tile of a display of the test and measurement instrument, and displaying the second signal via the second measurement view in a second tile of the display of the test and measurement instrument; and while operating in the synchronized mode, changing the second tile to display the second signal in accordance with the first subset of the first set of configuration parameters.

9. The method of claim 8, further comprising:

while operating in the synchronized mode, enlarging one of the first or second tiles so that the tile fills the display.

10. The method of claim 1, the method further comprising:

while operating in the unsynchronized mode:

displaying the first signal via the first measurement view in a first tile of a display of the test and measurement instrument;

displaying the second signal via the second measurement view in a second tile of the display of the test and measurement instrument;

displaying the first signal via a third measurement view in a third tile of the display of the test and measurement instrument, wherein the third measurement view is in accordance with a third set of configuration parameters associated with the third measurement view;

displaying the second signal via a fourth measurement view in a fourth tile of the display of the test and measurement instrument;

while operating in the synchronized mode:

synchronizing the first and second tiles of the display by displaying the second signal via the first measurement view in the second tile of the display; and synchronizing the third and fourth tiles of the display by displaying the second signal via the third measurement view in the fourth tile of the display.

11. The method of claim 1, wherein the test and measurement instrument is a first test and measurement instrument, the method further comprising:

receiving a third signal under test associated with a first channel of a second test and measurement instrument;

receiving a fourth signal under test associated with a second channel of the second test and measurement instrument;

while operating in the synchronized mode, displaying the third and fourth signal via the first measurement view; and while operating in the unsynchronized mode, displaying the third and fourth signal via a third measurement view and a fourth measurement view, respectively, wherein the third measurement view is associated with the first channel of the second test and measurement instrument and the fourth measurement view is associated with the second channel of the second test and measurement instrument.

12. The method of claim 1, further comprising receiving two or more additional signals under test, respectively associated with two or more additional channels of the test and measurement instrument;

while operating in the synchronized mode, displaying the two or more additional signals via the first measurement view; and while operating in the unsynchronized mode, displaying the two or more additional signals in accordance with two or more additional measurement views respectively associated with the additional channels.

13. A test and measurement instrument, comprising:

a display unit;

a first input terminal to receive a first signal associated with a first channel;

a second input terminal to receive a second signal associated with a second channel;

a controller coupled with the display unit, the first input terminal, and the second input terminal, the controller configured to:

display, via the display unit, the first signal via a first measurement view in accordance with a first set of configuration parameters associated with the first signal, display, via the display unit, the second signal in a second measurement view in accordance with a second set of configuration parameters associated with the second signal, receive a synchronized view enable preference, in response to the synchronized view enable preference, operate in a synchronized mode through: replication of a first subset of the first set of configuration parameters to a second subset of the second set of configuration parameters, and automatic reflection of subsequent changes made to the first subset in the second subset, receive a synchronized view disable preference, and in response to the synchronized view disable preference, operate in an unsynchronized mode through: automatic return of the second subset to an original state, while maintaining a current state of the first subset, and disablement of the automatic reflection of subsequent changes made to the first subset in the second subset.

14. The test and measurement instrument of claim 13, wherein the controller is further configured to:

cause the display unit to be visually divided into first and second tiles, and wherein while operated in the unsynchronized mode the first tile is structured to display the first signal via the first measurement view and the second tile is structured to display the second signal via the second measurement view.

15. The test and measurement instrument of claim 14, further comprising:

one or more additional input terminals to respectively receive one or more additional signals, wherein the one or more additional input terminals are respectively associated with one or more additional channels of the test and measurement instrument wherein the controller is configured to:

display, via the display unit, the one or more additional signals via one or more additional measurement views in accordance with one or more additional sets of configuration parameters respectively associated with the one or more additional channels, while operated in the synchronized mode, replicate the first subset to corresponding subsets in each of the one or more additional sets of configuration parameters.

16. The test and measurement instrument of claim 14, wherein:

while operated in the synchronized mode, the first tile is structured to display the first signal via the first measurement view and the second tile is structured to display the second signal via the first measurement view.

17. The test and measurement instrument of claim 14, wherein:

the controller is further configured to cause a synchronized accumulation of data over a period of time for both of the first and second channels.

18. The test and measurement instrument of claim 14, wherein:

the first measurement view is a waveform measurement view; and the first subset includes at least one of a waveform position, a display style, a filter parameter, a line selection, a sweep parameter, a gain parameter, a voltage cursor, and a time cursor.

19. The test and measurement instrument of claim 14, wherein:

the first measurement view is a vector measurement view; and the first subset include at least one of a line selection, a gain parameter, a display style, or a vector position control.

20. The test and measurement instrument of claim 14, wherein:

the first measurement view is a picture measurement view; and the first subset include at least one of a closed caption display parameter and a graticules parameter.

21. The test and measurement instrument of claim 20, wherein the graticules parameter includes a safe area parameter.

22. The test and measurement instrument of claim 14, wherein:

the first measurement view is a gamut measurement view including at least one of an arrowhead, a diamond, a split-diamond, and a spearhead; and the first subset includes at least one threshold.

23. The test and measurement instrument of claim 14, wherein:

the first measurement view is a status and session measurement view including textual information having at least one of an error log, an alarm status, a video session, an audio session, an audio control, a channel status, an auxiliary data status, a serial digital interface (SDI) status, and an ancillary data display; and the first subset includes at least one of a start control, a pause control, a stop control, a reset control, and a page selection.

24. The test and measurement instrument of claim 14, wherein:

the first measurement view is a datalist measurement view including alpha-numeric data describing the digital content of the first and second video signals; and the first subset includes at least one of a line select, a sample select, and a zoom control.

25. The test and measurement instrument of claim 14, wherein:

the first measurement view is an eye and jitter measurement view including plots of voltage or jitter versus time of transmissions of at least one of the first and second video signals; and the first subset includes at least one of a gain parameter, a sweep parameter, a position, a voltage cursor, and a time cursor.

26. One or more non-transitory computer-readable media having instructions embodied thereon, which, when executed by one or more processors of a test and measurement device cause the test and measurement device to:

receive a synchronized view enable preference;

in response to the synchronized view enable preference, activate a synchronized mode through: automated replication of first measurement view configuration parameters to corresponding configuration parameters of second measurement view configuration parameters, and automatic replication of subsequent changes made to the first measurement view configuration parameters to the corresponding configuration parameters of the second measurement view configuration parameters, wherein the first measurement view configuration parameters are associated with a first measurement view of a first signal displayed by the test and measurement device and the second measurement view configuration parameters are associated with a second measurement view of a second signal displayed by the test and measurement device;

receive a synchronized view disable preference; and in response to the synchronized view disable preference, activate an unsynchronized mode through: automatic return of the corresponding configuration parameters to an original state, and disablement of the automatic replication of changes made to the first measurement view configuration parameters, wherein the original state is based on values of the corresponding configuration parameters prior to receipt of the synchronized view enable preference.

27. The one or more non-transitory computer-readable media of claim 26, wherein the first and second signals include video signals and the test and measurement instrument is a waveform monitor.

* * * * *